Feb. 26, 1957    F. G. HAFFNER    2,783,017
VOLUME LIMITING MECHANISM FOR
A VOLUMETRIC FILLING MACHINE
Filed Jan. 24, 1955    6 Sheets-Sheet 1

INVENTOR.
Fred G. Haffner
BY
J. Stanley Churchill.
ATTORNEY.

Feb. 26, 1957

F. G. HAFFNER
VOLUME LIMITING MECHANISM FOR
A VOLUMETRIC FILLING MACHINE 2,783,017

Filed Jan. 24, 1955

INVENTOR.
Fred G. Haffner
BY
J. Stanley Churchill
ATTORNEY

Feb. 26, 1957 F. G. HAFFNER 2,783,017
VOLUME LIMITING MECHANISM FOR
A VOLUMETRIC FILLING MACHINE
Filed Jan. 24, 1955 6 Sheets-Sheet 3
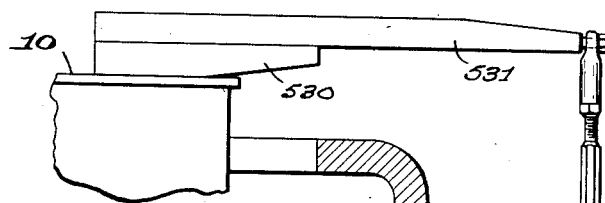
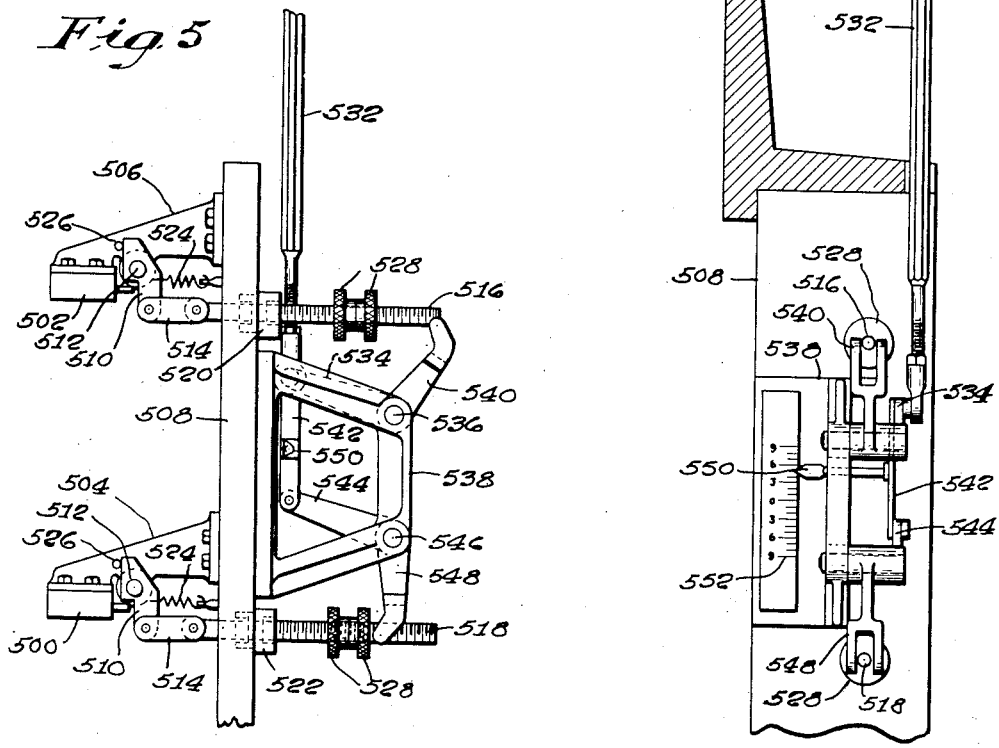
INVENTOR.
Fred G. Haffner
BY
J. Stanley Churchill
ATTORNEY Feb. 26, 1957

F. G. HAFFNER 2,783,017

VOLUME LIMITING MECHANISM FOR
A VOLUMETRIC FILLING MACHINE

Filed Jan. 24, 1955

INVENTOR.
Fred G. Haffner
BY
J. Stanley Churchill
ATTORNEY

INVENTOR.
Fred G. Haffner
BY
J. Stanley Churchill
ATTORNEY

Feb. 26, 1957
F. G. HAFFNER
2,783,017
VOLUME LIMITING MECHANISM FOR
A VOLUMETRIC FILLING MACHINE
Filed Jan. 24, 1955
6 Sheets-Sheet 6
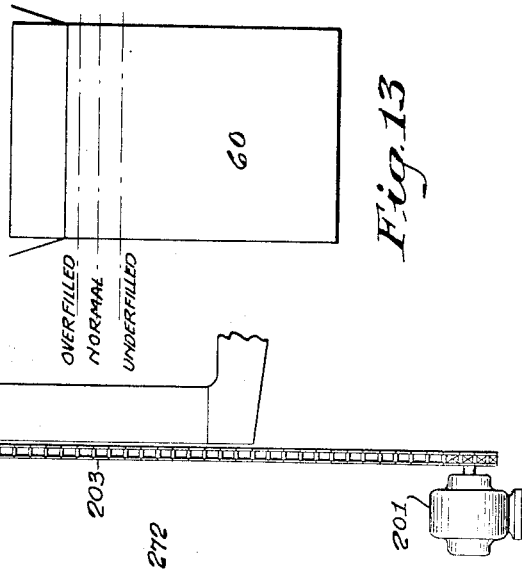
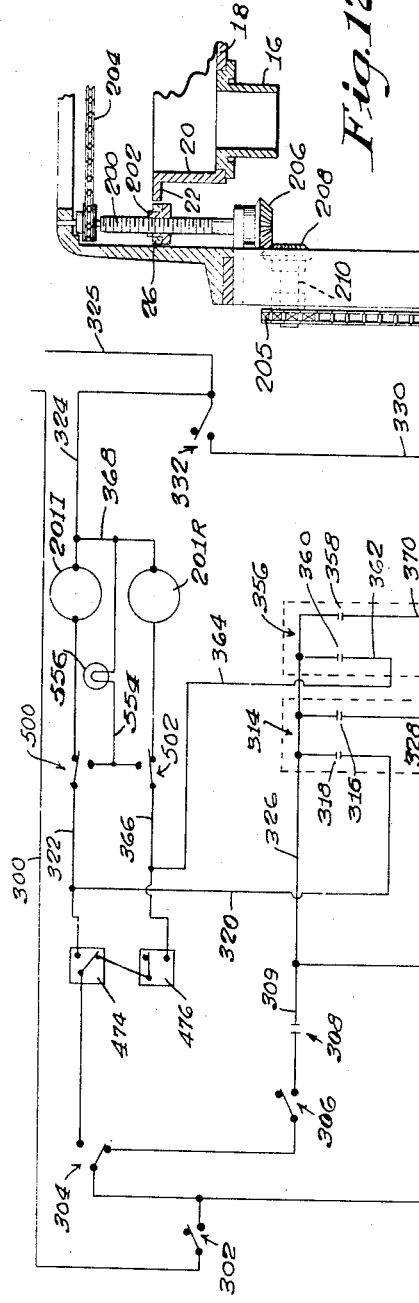
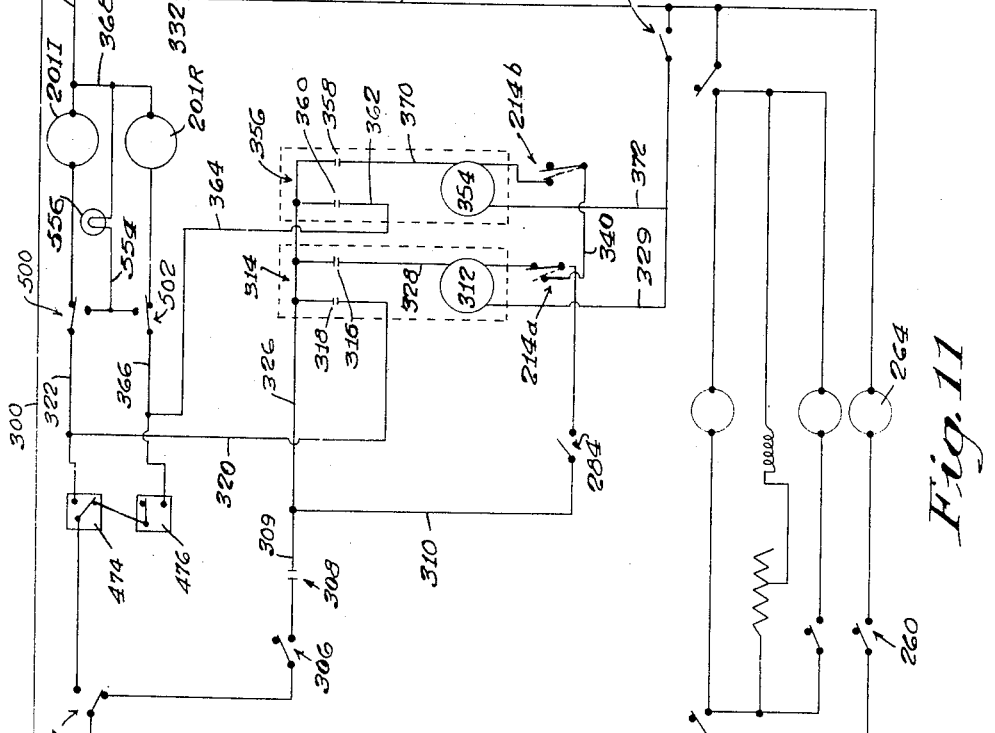
INVENTOR.
Fred G. Haffner
BY
J. Stanley Churchill
ATTORNEY United States Patent Office 2,783,017
Patented Feb. 26, 1957

2,783,017

VOLUME LIMITING MECHANISM FOR A VOLUMETRIC FILLING MACHINE

Fred G. Haffner, Wollaston, Mass., assignor to Pneumatic Scale Corporation, Limited, Quincy, Mass., a corporation of Massachusetts Application January 24, 1955, Serial No. 483,711

6 Claims. (Cl. 249—17)

This invention relates to volume limiting mechanism for a volumetric filling machine.

The invention has for an object to provide novel and improved volume limiting mechanism for a volumetric filling machine of the type having provision for forming and delivering successive measured loads and for adjustably varying the volumes of the loads, wherein provision is made for rendering the adjusting means inoperative when either a predetermined maximum or minimum selected volumetric limit of adjustment is reached whereby to prevent formation and delivery of loads over or under such predetermined limits.

A further object of the invention is to provide novel and improved volume limiting mechanism for a volumetric filling machine of the type wherein provision is made for check weighing one of the measured loads, and for adjustably varying the volumes of the loads in accordance with the variations in weight of the check weighed load from predetermined limits in which provision is made for discontinuing the operation of the volume varying means at selected maximum and minimum volumetric limits with respect to the volume of the containers being filled whereby to prevent formation and delivery of loads which would produce excessively overfilled or underfilled containers.

With these general objects in view and such others as may hereinafter appear the invention consists in the volume limiting mechanism for a volumetric filling machine and in the various structures, arrangements and combinations of parts hereinafter described and particularly defined in the claims at the end of this specification.

In the drawings illustrating the preferred embodiment of the invention:

Fig. 4 is a front elevation, partly in cross section, of switch mechanism and associated linkage shown in Fig. 2;

Fig. 5 is a side elevation of the same;

Fig. 11 is a wiring diagram embodying the control mechanism;

Fig. 12 is a cross sectional view of a portion of the volume varying mechanism as seen from the line 12—12 of Fig. 1; and Fig. 13 is a front elevation of a container indicating different filling heights therein.

Figure 1:
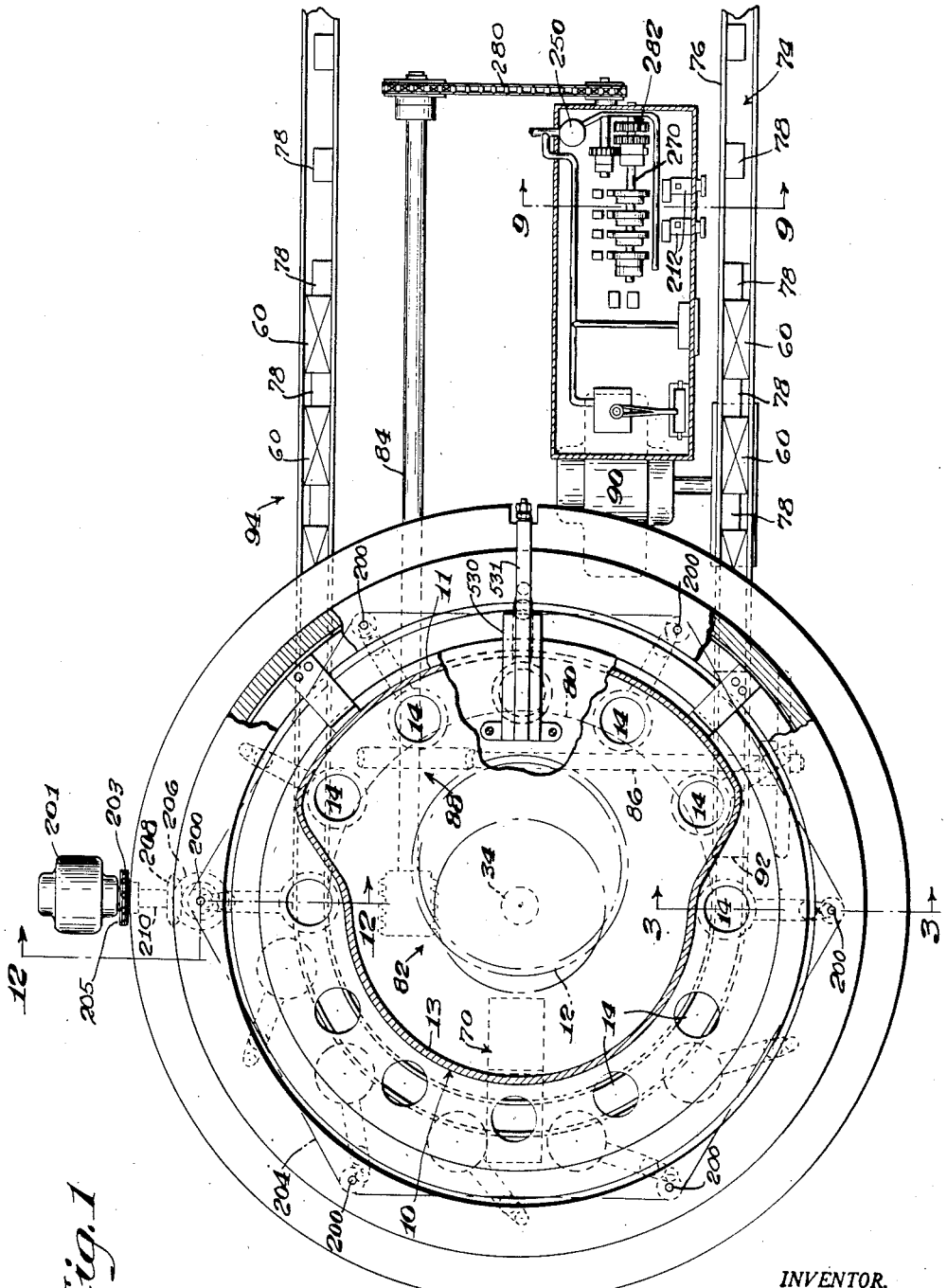
Fig. 1 is a plane view of a volumetric filling machine embodying the present invention.

In general in its preferred form the present invention contemplates novel volume limiting means embodied in a volumetric filling machine of the type illustrated and described in the United States patent to Stanley R. Howard, No. 2,678,185, wherein successive measured loads are formed by continuously moving volumetric measuring chambers, the measured loads being delivered into successive containers moved along therewith, and of the type in which provision is made for periodically check weighing one or more of a series of the measured loads thus formed and for automatically adjusting the volume of the measuring chambers in accordance with the variations in the weight of the check weighed load from predetermined limits. In the illustrated embodiment of the invention the present volume limiting means is shown in a volumetric filling machine of the type in which the measuring chambers, which are telescopically adjustable, are arranged to be adjusted to increase or decrease the volume of the chambers in response to the operation of the check weigher by mechanism including a reversible motor. In practice the containers into which the loads are preferably delivered are proportioned to hold a predetermined weight whose volume may vary within reasonable limits in accordance with normal variations in density of the material being packaged. However, in the event that the specific gravity of the material varies abnormally to an extent such as to form a predetermined weight load of excessively small volume, the resulting filling level or height in the container will be so low as to be commercially unacceptable because of consumer reaction to an underfilled container. Conversely, in the event that the specific gravity of the material varies abnormally to an extent such as to form a predetermined weight load of excessively large volume, the resulting filling level would be so high as to interfere with the subsequent container closing operations.

In accordance with the present invention provision is made for opening the circuit to the reversible motor to discontinue the volume varying operation when the adjustment of the measuring chambers reaches selectively adjustable maximum positions of increase or decrease in volume whereby to prevent formation and delivery of loads whose volume would result in either underfilled or overfilled containers.

Referring now to the drawings, the invention is herein illustrated as embodied in a rotary filling machine of the general type illustrated and described in the United States patent to Howard, No. 2,678,185, and which, as herein shown, may comprise a generally circular non-rotating hopper 10 containing a supply of the material delivered thereto by gravity or otherwise through a pipe 12 connected to a main source of supply and a series of telescopically adjustable measuring chambers 14 preferably equally spaced in a circle and mounted to revolve beneath the hopper 10 to receive their loads. As illustrated in plan in Fig. 1, the hopper 10 is irregular in shape having a side wall 11 of large radius in one portion of its periphery arranged to extend over a number of the chambers 14 to effect filling thereof as the chambers pass under the extended portion of the hopper. The hopper is also provided with a side wall 13 formed on a smaller radius so that as the chambers are rotated around such side wall they are maintained out of contact with the material in the hopper and are open to the atmosphere.

Figures 2, 3:
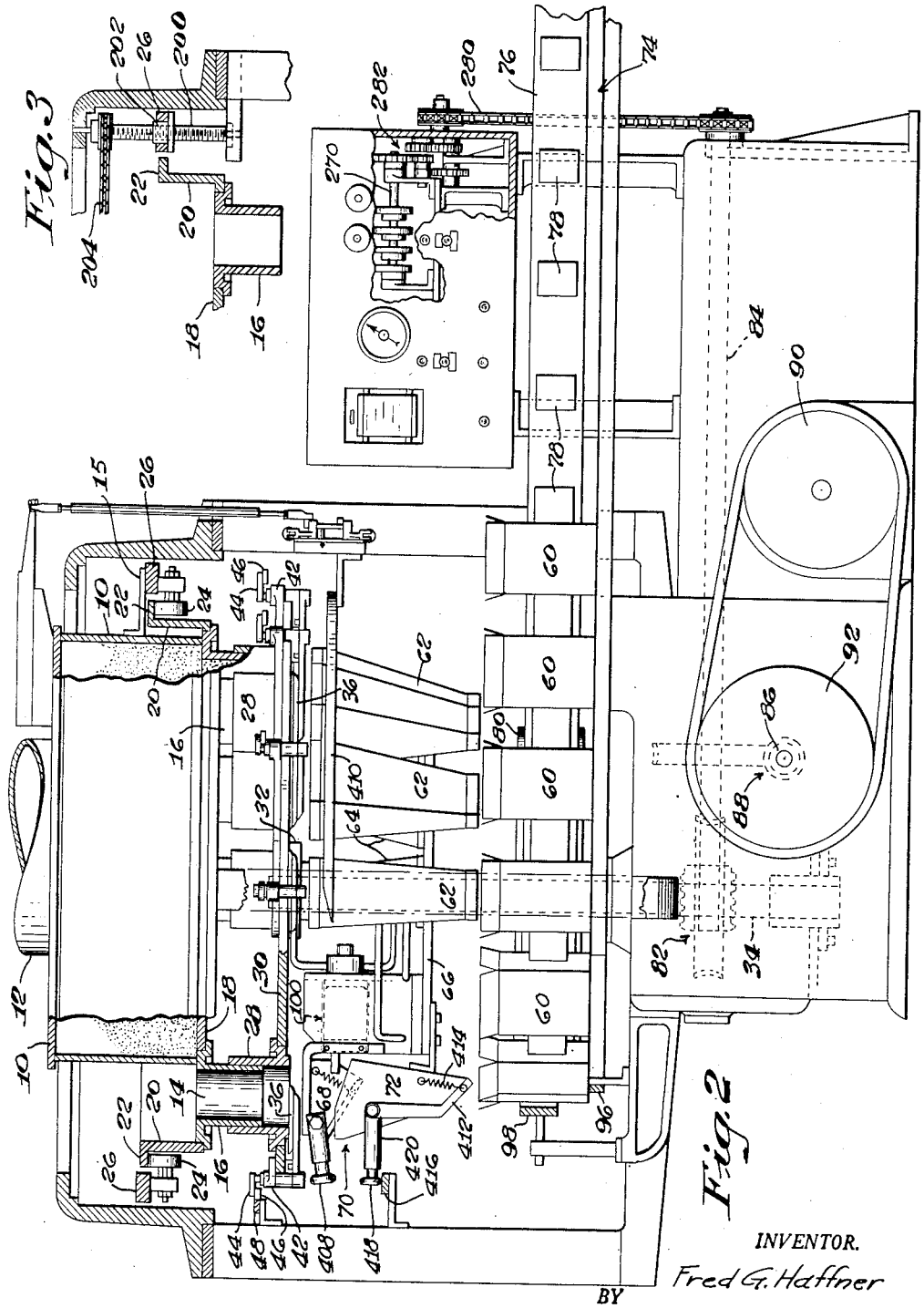
Fig. 2 is a side elevation of the same, partly in cross section.
Fig. 3 is a cross sectional detail taken on the line 3—3 of Fig. 1.

As illustrated in Fig. 2, the upper portions of the telescopically adjustable measuring chambers 14 may comprise a plurality of flanged tubes 16 supported in and depending from a rotary disk 18 which forms the bottom of the hopper. The rotary disk 18 is provided with an upstanding annular side wall 20 having a flange or track portion 22 arranged to ride on and be supported by a plurality of rollers 24 carried by a vertically adjustable supporting ring 26. The lower portions of the measuring chambers 14 may comprise a plurality of corresponding upstanding tubes 28 telescopically fitted about the upper tubes 16 and supported in a rotary disk 30 secured by a flange member 32 to the upper end of a continuously rotated central shaft 34, the telescoping connection imparting rotary movement to the upper portions of the chambers 14 during the operation of the machine. The non-rotating hopper 10 may be supported by brackets 15 secured to and extended from the vertically adjustable supporting ring 26 so that in operation the hopper 10 will be moved vertically with the ring 26 during adjustment of the measuring chambers.

As herein shown, each chamber 14 is provided with a cam operated bottom closure valve 36, and in the operation of the machine successive measuring chambers are filled as they pass under the filling portion 11 of the hopper 10 at which time the bottoms of the chambers 14 are closed by the valves 36, and when the chambers pass out from under the filling portions of the hopper the valves may be moved to open the bottoms of the chambers to release the measured loads. Each cam operated valve 36 is fast on a vertical stud rockingly supported in a bearing member 42 attached to the rotary disk 30, the upper end of the stud being provided with an arm 44 carrying a roller 46 for cooperation with a cam piece 48 supported from the machine frame. The valve may be urged to a closed position against a stop by spring means, not shown, and engagement of the rolls 46 with the cam piece 48 is arranged to rock the valve into an open position to effect release of the measured load.

In the operation of the machine all of the measured loads in the chambers 14, except one load, are released into successive cartons 60 being moved along therebeneath, the material being guided into the cartons through funnels 62 supported by brackets 64 attached to a rotary disk 66 fast on the central shaft 34. The remaining measured load may and preferably will be deposited in a weighing receptacle 68 forming a part of the check weighing mechanism indicated generally at 70, such check weighed load being subsequently released into a second receptacle 72 disposed beneath the weighing receptacle, and thereafter the load is released from the lower receptacle 72 into a carton 60 disposed therebeneath during a succeeding revolution of the filling units, as will be hereinafter more fully described.

As shown in Fig. 1, the cartons 60 may be delivered to the machine along a conveyer 74 by an upstanding flexible metal belt 76 having a series of spaced blocks 78 attached thereto and between which the cartons are engaged. The belt 76 is arranged to cooperate with a driving pulley 80 fast on the central shaft 34 and arranged to register successive cartons in alignment with their respective filling units, the belt being provided with suitable projections for engagement in sockets, not shown, formed in the pulley 80. As illustrated in Fig. 1, the central shaft 34 may be driven through a worm gear drive 82 connected to a shaft 84 which in turn may be connected to a drive shaft 86 through a second worm gear drive 88. As shown in Fig. 2, the drive shaft 86 may be driven by an electric motor 90 belted to a pulley 92 fast on the shaft 86. In the operation of the filling machine, as illustrated in Fig. 1, the cartons may be delivered along the conveyer 74 from a supply thereof, and successive cartons 60 are arranged to come into alignment with successive filling units at the point of tangency with the semicircular path through which the cartons are guided in the machine, the cartons remaining in alignment with their respective filling units through 180° and then being delivered from the machine on a discharge conveyer 94. The cartons may be guided through the semicircular path on a bottom support rail 96 and by a side rail 98, as shown in Fig. 2.

Provision is made for automatically correcting the volume of the telescopic measuring chambers 14 by adjusting the upper portion 16 of the chambers relative to the lower portions 28 when the weight of the measured load as detected by the check weighing unit 70 is found to deviate abnormally beyond a predetermined range, as will be hereinafter more fully described.

Figure 6:
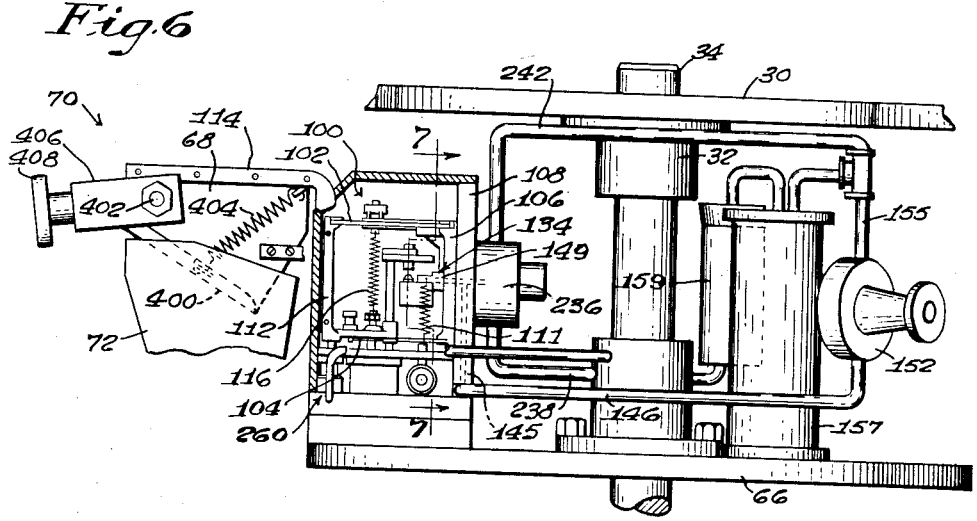
Fig. 6 is a side elevation, partly in cross section, of the check weighing mechanism, shown in Fig. 2.

As illustrated in Fig. 2, the weighing unit 70 is disposed immediately beneath a measuring chamber 14, the weighing receptacle 68 being attached to and forming a part of the free end of a cantilever spring beam 100, see Fig. 6, which may and preferably will comprise the cantilever weighing unit of the type illustrated and described in the Howard patent, No. 2,678,185, and which includes two upper and two lower relatively stiff cantilever springs 102, 104 of equal length, the leaf springs being connected at their inner ends to a rigid member 106 attached to an upstanding end frame 108 mounted on the rotary supporting disk 66. The other ends of the leaf springs 102, 104 may be secured to a second rigid connecting member 112 to which the weighing receptacle 68 is attached by straps 114. The weighing unit is also provided with a coil spring 116 arranged to exert a counterforce upon the weighing beam, and a second coil spring 111 adapted for fine adjustment of the weighing unit is arranged to be manually adjusted to increase or decrease the tension thereof. In practice the coil spring 116 serves to counteract the weight of the weighing receptacle 68 and associated parts which are mounted upon the outer ends of the leaf springs, the coil spring 116 being of such strength as to support nearly all of the weight of the measured load being check weighed without deflection of the leaf springs so that the deflection of the leaf springs may be proportionate to the deviation in weight above a predetermined minimum weight limit, as fully illustrated and described in the Howard patent, No. 2,678,185.

As herein shown, provision is made for measuring the deflection of the spring beam 100 when depressed by the load being check weighed to indicate the weight of the load and more particularly to detect any deviation over or under a predetermined weight. In practice the stiff cantilever springs 102, 104 are selected so that the weighing beam has a relatively small deflection value, and sensitive pneumatically operated control means indicated generally at 134 is arranged to cooperate with the present spring beam for indicating or measuring the relatively small deflection of the spring beam when depressed by the load released from a measuring chamber 14. The pneumatically operated unit 134 is constructed so that a large pressure change occurs upon deflection of the spring beam through a minute distance, and in general the deflection of the spring beam is arranged to vary the pressure in the pneumatically operated unit by an amount proportionate to the deflection, an overweight load effecting a relatively large increase in pressure and an underweight load increasing the pressure a lesser amount, and such different pressures may be translated into movement to effect actuation of volume correcting mechanism whereby to effect a decrease or an increase respectively in the volume of the measuring chambers 14 when an abnormal deviation from a predetermined weight is detected. The present invention is characterized by novel mechanism for discontinuing the adjustment of the chambers at selected maximum and minimum limits whereby to prevent the formation of loads which would otherwise produce excessively overfilled or underfilled containers.

Figure 7:
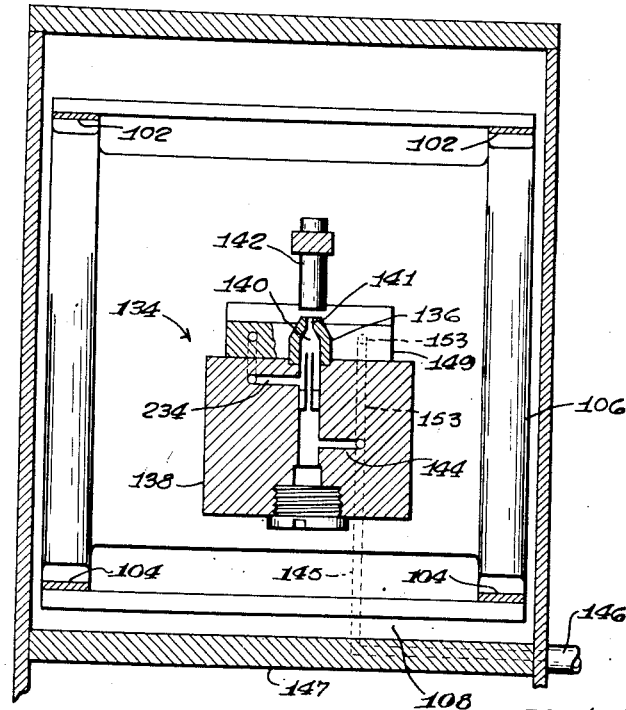
Fig. 7 is a cross section view of a pneumatically operated control unit as seen from the line 7—7 of Fig. 6.

As shown in Figs. 6 and 7, in general the pneumatically operated control mechanism 134 may be of the type wherein a conduit or jet member 136 carried by a block 138 having a chamber 140 communicates with the jet through which air under substantial pressure may be caused to flow to be discharged through a discharge orifice 141 in the jet which is arranged to cooperate with a valve member 142 operatively connected to and movable with the weighing beam unit 100. The inlet 144 may be supplied with a regulated source of air through a pipe 146 and connecting passageways 145 formed in a bottom tie member 147, end frame member 108 and through a forwardly extended portion 149 of the rigid member 106 of the weighing beam 100, the block 138 being attached to the extended portion 149. The extension 149 is provided with openings communicating with passageways 153 formed in the block 138 and leading to the inlet 144. As diagrammatically illustrated in Fig. 8, the inlet pipe 146 may be connected by a secondary regulator 152, air pipe 155, tank 157, secondary filter 159 and pipe line 161 to passageway 154 formed in the continuously rotated central shaft 34, the lower end of the passageway 154 communicating through a stationary adapter 158, diagrammatically indicated in Fig. 8, with a pipe 160, then through a primary regulator 161 and a primary filter 163 to the source of air, thereby enabling the pneumatically operated unit 134 to be supplied with air during the continuous rotation of the check weighing unit 70 with the shaft 34. In operation the spring beam unit 100 may be adjusted to maintain the valve member 142 in a slightly elevated position spaced from the small discharge orifice 141, and upon minute deflection of the spring beam under the influence of the load, the valve 142 is moved toward the discharge orifice a minute amount, thereby effecting a substantial pressure rise in the chamber 140.

As herein shown, provision is made for utilizing the increase in pressure in the chamber 140 through control mechanism adapted to automatically effect adjustment of the upper portion 16 of the measuring chambers 14 relative to the lower portion 28 thereof to effect either an increase or a decrease in the volume of the measuring chambers. As illustrated in Fig. 12, the mechanism for adjusting the measuring chambers may include a plurality of screws 200 rotatably mounted in the machine frame, see also Figs. 1 and 3, and arranged to cooperate with nuts 202 secured in the supporting ring 26. The screws 200 may be connected to rotate together by a chain and sprocket drive 204, and one of the screws may be provided with a bevel gear 206 arranged to mesh with a bevel gear 208 fast on a shaft 210 mounted for rotation in the machine frame. Rotation of the screws 200 may be effected by control mechanism including a reversible electric motor 201 connected by a chain 203 to a sprocket 205 fast on the end of the shaft 210 on which the bevel gear 208 is mounted, the motor 201 forming part of a control circuit for selectively adjusting the chambers, as will be described. In operation rotation of the screws 200 in one direction will effect elevation of the upper portions 16 of the measuring chambers to increase the volume of subsequent loads, and rotation of the screws in the opposite direction will cause the upper portions 16 to be lowered into the portions 28 to decrease the volume of the chambers.

Figure 8:
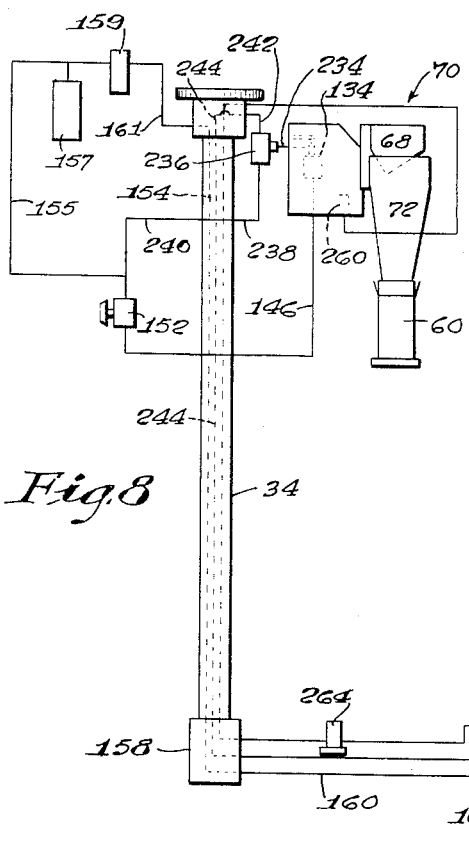
Fig. 8 is a diagrammatic view of the air pipes for the pneumatic control lines.
Figure 9:
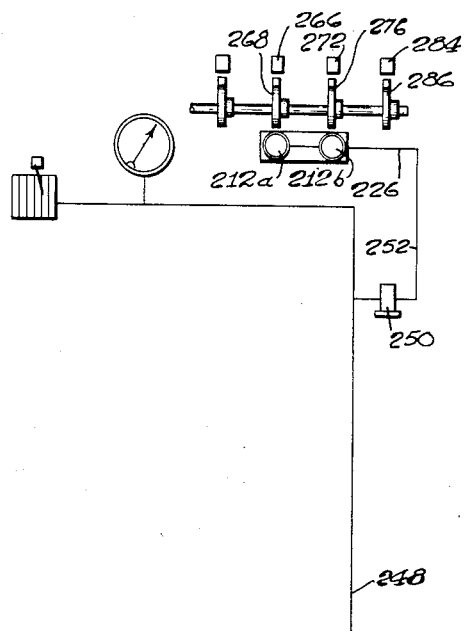
Fig. 9 is a cross sectional view of a portion of the control mechanism taken on the line 9—9 of Fig. 1.
Figure 10:
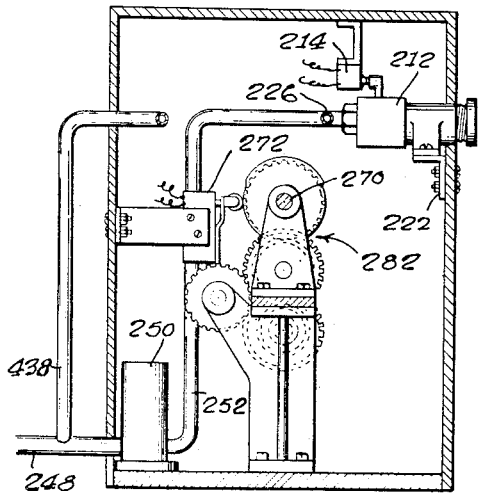
Fig. 10 is a cross sectional view of a pneumatically operated switch unit shown in Fig. 9.

As illustrated in Figs. 8, 9 and 10, the control mechanism may include a pair of pneumatically controlled switch operating units 212, the switches 214 forming a part of the electrical circuit arranged to effect operation of the reversible motor in one direction or the other. As illustrated in detail in Fig. 10, each pneumatically controlled switch operating unit 212 includes a contact engaging arm 216 extended from a disk 218 slidingly mounted in a casing 220 supported in a bracket 222 from the machine frame. One end of the casing 220 is provided with a pressure responsive element herein shown as comprising a rubber bellows 224 in communication with an air pipe 226 forming a part of the pneumatic control system, the rubber bellows being engageable with one face of the disk 218. The other end of the casing is provided with an adjusting screw 228 and a coil spring 230 interposed between the opposite face of the disk 218 and the end of the screw. The spring 230 may be adjusted so that the contact engaging arm 216 is normally in engagement with the microswitch 214 to hold the same in an inoperative position, and so that in operation when the pressure in the bellows 224 reaches a predetermined amount the arm 216 is urged away from the switch to permit it to close a selected circuit to effect adjustment of the measuring chambers in one direction or the other, as will be described.

As diagrammatically illustrated in Fig. 6, provision is made for amplifying and controlling the pressures built up in the chamber 140 of the pneumatic control mechanism 134 to provide sufficient air flow and pressure to operate the pneumatically controlled switch operating units 212, and as herein shown, the chamber 140 is connected by passageways 234 to a pressure transmitting unit 236 mounted on the end frame member 108. The transmitting unit 236 may comprise a commercially available unit functioning in the manner of a booster relay or an automatic pressure regulator and is provided with an inlet 238 connected by a branch air line 240 from the line 155. The outlet line 242 is arranged to communicate with a return passageway 244 formed in the central shaft 34, the lower end of the passageway communicating with the adapter 158, see Fig. 8, which in turn is connected by a pipe line 248, solenoid valve 250 and pipe line 252 to the lines 226 leading to the pressure responsive bellows 224 of the pneumatically controlled switch operating units 212. In operation the variations in pressure in the chamber 140 as caused by depression of the weighing beam 100 are arranged to modify the pressure in the transmitting unit 236 an amount proportionate to the increase in pressure in the chamber 140 to effect operation of the pneumatically controlled switch operating units 212.

In the illustrated embodiment of the invention two pneumatically controlled switch operating units 212 are shown, each being arranged to be actuated by different pressures in the chamber 140 of the pneumatic unit 134 as effected by the depression of the spring beam 100 under the influence of the check weighed load, each operating unit being arrange to close a different circuit to effect either an increase or a decrease in the volume of the chambers 14.

In practice the present volumetric filling machine is arranged to operate in cycles with respect to the check weighing unit 70 wherein one revolution of the rotary filling unit comprises a check weighing cycle and a succeeding revolution thereof comprises a chamber adjusting cycle. Provision is made for locking the weighing beam 100 during the chamber adjusting cycle and for unlocking the weighing beam during a portion of the check weighing cycle to permit the beam to be depressed under the influence of the load. The weighing beam locking mechanism may comprise a pneumatically operated unit of any usual or preferred design indicated generally at 260 in Fig. 6, the compressed air line to the unit 260 including a solenoid operated valve 264, see Fig. 8, arranged to be actuated by closing of a switch 266 by a cam 268 fast on a cam shaft 270, the cam 268 permitting opening of the switch 266 to deenergize the solenoid and close the valve during a portion of the weighing cycle. Provision is also made for limiting the duration of operation of the reversible motor 201 during the correcting cycle, and as herein shown, a cam operated switch 272 is provided in the motor circuit arranged to be closed by a cam 276 fast on the cam shaft 270, the cam being arranged to limit the time of operation of the motor in either direction.

In order to control the operation of the filling machine to provide successive check weighing and correcting cycles, the cam shaft 270 is arranged to be rotated at a ratio of one to two with relation to the rotation of the filling heads so that one-half revolution of the cam shaft 270 is equal to a full revolution of the filling heads, succeeding one-half revolutions of the cam shaft corresponding to successive weighing and correcting cycles respectively of the filling heads. As illustrated in Figs. 2 and 9, the cam shaft 270 is arranged to be driven from the shaft 84 of the filling machine by a chain and sprocket drive 280 and through a gear train 282 to effect rotation of the cam shaft one-half revolution for each revolution of the filling heads.

It will be understood that in operation a measured load is delivered into the check weighing receptacle 68 each cycle of operation, such load being released into the lower receptacle 72 during the same cycle to be released into a carton moving along therewith during the next cycle of operation. However, a check weighing operation is performed during only every other cycle which is effected by unlocking of the weighing beam during a portion of the check weighing cycle, the weighing beam remaining locked during the entire correcting cycle. Thus, after the first cycle of operation when starting the machine, the carton being moved along beneath the weighing unit 70 will be provided with a measured load released from the receptacle 72 each cycle of operation.

Referring now to Fig. 11, the electrical diagram therein shown in association with the pressure operated switches 214 and the cam operated switches defines the different circuits for effecting adjustment of the measuring chambers and includes two microswitches 214a and 214b arranged to be actuated by their individual pneumatically operated units 212a and 212b respectively. The reversing motor 201 is indicated in the diagram by motor reversing starters 201I for operating the motor in one direction to increase the volume and 201R for operating the motor in the other direction to reduce the volume of the measuring chambers. The cam operated switch for determining the duration and extent of the adjusting operation is indicated at 272, and a second cam operated switch 284 comprising a signal switch is arranged to be closed by a cam 286 at the beginning of the correcting cycle to energize the circuit and initiate the chamber adjusting or correcting operation.

The circuit to the motor reversing starters includes a line 300 from the main line, manually operated switches 302, 304, 306, a carton feed operated switch 308, lines 309, 310 and signal switch 284 to a terminal of the first pneumatically operated switch 214a. As indicated in Fig. 11, the pneumatically operated switches 214a and 214b are arranged to be connected in series and are normally maintained in the position shown in Fig. 11 wherein the switch 214a is closed to energize a coil 312 of a magnetic switch 314 which operates to close the circuit at contacts 316 and 318, the circuit to one terminal of the motor starter 201I being completed through lines 320, 322, the other terminal of the motor starter 201I being connected by a line 324 to the main return line 325. The magnetic switch contacts 316 are arranged to close a holding circuit to the coil 312 from the line 309 through lines 326, 328 to one terminal of the coil, the other terminal being connected by line 329 to the cam operated switch 272, and through line 330 and manually operated switch 332 to the main line 325.

Thus, in operation when the check weighed load causes a relatively low pressure, indicating that the load is underweight requiring an increase in the volume of the chambers, the switch 214a will remain in its normally closed position, and when the signal switch 284 and cam operated switch 272 are closed at the start of the correcting cycle, the motor 201 will be energized to effect an increase in the volume of the measuring chambers, the cam operated switch 272 holding the circuit closed for a predetermined length of time to effect an increase in volume to correct the underweight condition of the load. The motor circuit is opened by the cam switch 272 at the end of the predetermined time interval to discontinue the correcting operation and to deenergize the magnetic switch coil 312. It will be understood that the signal switch 284 is closed only momentarily, until the holding circuit is energized to initiate the correcting operation, the cam operated switch 272 being closed substantially simultaneously with closing of the signal switch.

When the check weighed load effects an increase in pressure such as to indicate that the load is of a satisfactory weight within commercially accepted limits, the pneumatically operated switch 214a will be actuated to open the circuit to the coil 312, and since the switch 214b is normally open, as shown in Fig. 11, no correction in the volume is made.

When the check weighed load effects a further increase in pressure indicating that the load is overweight, such pressure will actuate both switches 214a and 214b, the switch 214a continuing the circuit through line 340 to switch 214b, the latter being actuated to close the circuit to the coil 354 of a magnetic switch 356 which operates to close the circuit at contacts 358, 360. The circuit is continued through lines 362, 364, 366 to one terminal of the reversing motor starter 201R, the other terminal being connected to the main line 325 by lines 368 and 324 to thus energize the motor to effect a decrease in the volume of the measuring chambers. The contact 358 forming a part of the holding circuit from line 326 continues the current through line 370 to one terminal of the coil 354, the other terminal being connected by line 372 to cam operated switch 272, the latter completing the circuit through lines 330 and switch 332 to the main line 325.

In the operation of the volumetric filling machine as thus far described successive measuring chambers 14 are filled as they pass under the filling portion of the hopper 10, the chambers remaining under the filling portion through substantially one-half a revolution of the filling units, during which time the valves 36 are closed and the chambers 14 are filled. When the chambers come into alignment with their responsive cartons the valves 36 are opened by the cam piece 48 to release the measured loads, the valves remaining open through substantially 180 degrees, whereupon the valves are again closed.

During the travel of the filling units in alignment with their cartons all of the measured loads except the one associated with the weighing unit 70 are delivered through the funnels 62 directly into their respective cartons 60 disposed therebeneath, the remaining load being released into the weighing receptacle 68. As illustrated in Figs. 2 and 6, the weighing receptacle 68 is provided with a shutter 400 pivotally mounted at 402 and normally maintained in a closed position by a spring 404. The shutter is also provided with an operating arm 406 having a cam roll 408 arranged to cooperate with a cam piece 410. The shutter 400 remains closed until after the load has been check weighed, whereupon the check weighed load is released into the lower receptacle 72 prior to coming into alignment with the cartons during a succeeding revolution of the filling heads. As shown in Fig. 2, the lower receptacle 72 is also provided with a shutter 412, normally maintained in a closed position by a spring 414, arranged to be opened by a cam piece 416 cooperating with a roller 418 carried by the shutter arm 420. When the lower receptacle comes into alignment with the cartons, the shutter 412 is opened to release the previously check weighed load into a carton, the shutter being subsequently closed prior to arrival at the point where the cartons are discharged onto the delivery conveyer. As above described, the measured load deposited in the receptacle 68 and released into the lower receptacle 72 during a non-check weighing cycle or correcting cycle is also released into a carton being moved along therewith so that the carton associated with the weighing unit 70 is provided with a measured load each cycle of operation.

In practice when it is desired to manually effect operation of the correcting mechanism the automatic correcting mechanism shown in Fig. 11 may be rendered inoperative by opening the circuit at switch 306 and closing the circuit at the manual correction switch 304, switches 474 and 476 being arranged for manual operation to close the circuits to the motor starter 201I or 201R to effect either an increase or a decrease in the volume of the measured loads.

Referring now to Figs. 4, 5 and 11, in accordance with the present invention provision is made for selectively limiting the maximum and minimum positions of adjustment of the measuring chambers 16, preferably by rendering the adjusting mechanism inoperative when such selected limits are reached. As herein shown, a pair of normally closed limiting switches 500, 502 are included in the circuits to the reversing motor starters 201I and 201R, the switch 500 being arranged to be opened when a selected limit of adjustment in a direction to increase the volume is reached, and the switch 502 being arranged to be opened when a selected limit of adjustment in a direction to reduce the volume is reached.

As seen in Fig. 5, the limiting switches 500, 502 may be supported in spaced relation by brackets 504, 506 respectively attached to an upstanding frame member 508 of the machine. Each switch is provided with an operating arm 510 pivotally mounted at 512, each arm 510 being connected by a link 514 to similar upper and lower threaded rods 516, 518 respectively. The rods 516, 518 may be slidingly mounted in bearing members 520, 522, and are normally urged outwardly or to the right, viewing Fig. 5, by springs 524 connected to the arms 510, the rods being limited in their movement to the right by stop pins 526 engageable with extended portions of the arms, as shown. Each rod 516, 518 is provided with a pair of knurled nuts 528 which may be rotated on the rod to a desired position of adjustment and then locked in adjusted position on its respective slide rod by tightening the nuts against each other.

The switches 500, 502 are arranged to be actuated through connections from the hopper 10 which, as above described, is connected to and movable vertically with the annular adjusting ring 26 during the chamber adjusting or correcting operation. As herein shown, a bracket 530 attached to the top of the hopper 10 is provided with an arm 531 extended therefrom which is connected by a link 532 to one arm 534 of a bell crank pivotally mounted at 536 in a bracket 538 attached to the frame member 508. The second arm 540 of the bell crank is provided with a yoked end arranged to straddle the upper rod 516 and engage the end of the outer nut 528 to push the rod 516 inwardly when the hopper is moved downwardly during the volume reducing operation to a predetermined minimum volume position. The inward movement of the rod 516 is arranged to actuate the switch 502 to open the circuit to the reversing starter 201R and thus prevent further correcting movement to reduce the volume beyond such predetermined minimum volume.

The arm 534 is connected by a link 542 to a parallel arm 544, the latter forming one arm of a second bell crank pivotally mounted at 546 in the bracket 538. The second arm 548 of the lower bell crank is provided with a similar yoked end arranged to straddle the rod 518 and engage the nut 528 to push the rod 518 inwardly when the hopper 10 is moved upwardly during the volume increasing operation to a predetermined maximum volume position. The inward movement of the rod 518 is arranged to actuate the switch 500 to open the circuit to the reversing starter 201I and thus prevent further correcting movement to increase the volume beyond such predetermined maximum volume position.

In practice the positions of the knurled nuts 528 on their rods 516, 518 may be varied by adjustment in order to change the relative maximum and minimum volume positions to correspond to the volume of a particular size of carton being filled. As illustrated in Figs. 4 and 5, a pointer 550 carried by and movable with the link 542 is arranged to cooperate with graduated marks 552 formed in the base of the bracket 538 for indicating to the operator the relative position of adjustment of the measuring chambers at any given time.

As also illustrated in Fig. 11, opening of either switch 500 or 502 simultaneously effects closing of a circuit through a line 554 having a lamp 556 or other signal for calling to the attention of the operator that a limit of adjustment has been reached, the circuit being completed through lines 368, 324 to the main line 325.

As herein shown, it will be observed that the limiting switches and the mechanism for effecting manual adjustment of the maximum and minimum volumetric limits are preferably disposed in a convenient position on the frame to enable adjustment thereof during the continuous operation of the machine.

From the above description it will be seen that the present invention as embodied in a volumetric filling machine of the type having provision for check weighing a measured load and for automatically changing the volume of the measuring chambers in accordance with the weight of the check weighed load is provided with novel control mechanism adapted to selectively limit the maximum and minimum volume adjustments of the measuring chambers relative to the volume of a particular size of carton to the end that the volume of the measured loads formed by the machine will not excessively overfill or underfill such carton. It will also be observed that such limiting mechanism also serves as a safety to prevent adjustment of the chambers in either direction to an extent such as to effect jamming of the adjusting mechanism.

While the preferred embodiment of the invention has been herein illustrated and described, it will be understood that the invention may be embodied in other forms within the scope of the following claims.

Having thus described the invention, what is claimed is:

1. A volumetric filling machine of the type described, having, in combination a plurality of measuring chambers, check weighing means associated with one of said chambers, means for adjusting the volume of said chambers in response to the operation of the check weighing means in the event of any deviation in the weight of the load beyond predetermined limits of a predetermined weight, limiting means responsive to the movement of the volume adjusting means for rendering the same inoperative when either a preselected maximum or minimum volumetric limit is reached, said adjusting means including an electrical circuit, a reversible motor in said circuit, said limiting means including a pair of spaced switches in said circuit connected to said reversible motor, switch operating means including a pair of engaging elements and a pair of reversely arranged bell cranks connected to form a parallel linkage operatively connected to and movable with said volume adjusting means, an arm of one bell crank cooperating with one of said engaging elements and an arm of the second bell crank cooperating with the other engaging element to actuate the respective switches, and means for adjusting said engaging elements relative to said bell crank arms to vary said preselected volumetric limits.

2. A volumetric filling machine as defined in claim 1 which includes signal means actuated by said limiting means when either a maximum or a minimum limit of adjustment is reached.

3. A volumetric filling machine of the type described, having, in combination, a plurality of measuring chambers, means for delivering the measured loads into containers, and means for adjusting the chambers to vary the volume of the measured loads, limiting means responsive to the movement of said volume adjusting means for rendering the same inoperative when when either a preselected maximum or minimum volumetric limit of adjustment is reached, said limiting means including means for adjusting the same to vary said volumetric limits with respect to the volume of the containers being filled whereby to prevent delivery of loads to containers which would produce excessively overfilled or underfilled containers, said limiting means including a pair of spaced engaging elements, and a pair of reversely arranged bell cranks, an arm of each bell crank being connected in parallel and operatively connected to said adjusting means, the other arm of each bell crank cooperating with its respective spaced engaging element.

4. A volumetric filling machine of the type described, having, in combination, a plurality of adjustable load forming chambers, means for delivering the measured loads into containers, check weighing means associated with one of said chambers arranged to receive and check weigh the load, means responsive to the check weighing means for automatically adjusting the volume of said load forming chambers in the event of any deviation in the weight of the load beyond predetermined limits of a predetermined weight, limiting means responsive to the movement of said adjusting means for discontinuing the adjusting operation when either a preselected maximum or minimum volumetric limit of adjustment is reached, said limiting means including a pair of spaced engaging elements, and a pair of reversely arranged bell cranks, an arm of each bell crank being connected in parallel and operatively connected to said adjusting means, the other arm of each bell crank cooperating with its respective spaced engaging element, and means for manually adjusting said engaging elements to selectively vary the volumetric limits with respect to the volume of the containers being filled whereby to prevent delivery of loads to containers which would produce excessively overfilled or underfilled containers.

5. A volumetric filling machine as defined in claim 4 wherein the automatic chamber adjusting means includes a reversible motor and wherein the volumetric limiting means includes a pair of switches in circuit with said motor arranged to be selectively opened by said engaging elements to discontinue the adjusting operation when either a maximum or minimum volumetric limit of adjustment is reached.

6. A volumetric filling machine as defined in claim 5 which includes signal means in said circuit arranged to be actuated when either a maximum or minimum volumetric limit of adjustment is reached.

References Cited in the file of this patent

UNITED STATES PATENTS

| | | |
|---|---|---|
| 2,354,087 | Raymer | July 18, 1944 |
| 2,628,055 | Knobel | Feb. 10, 1953 |
| 2,678,185 | Howard | May 11, 1954 |